United States Patent [19]
Meline

[11] 3,789,508
[45] Feb. 5, 1974

[54] EXTENSOMETER

[75] Inventor: Harry R. Meline, Minneapolis, Minn.

[73] Assignee: MTS Systems Corporation, Minneapolis, Minn.

[22] Filed: Aug. 18, 1971

[21] Appl. No.: 172,828

[52] U.S. Cl. .............................................. 33/148 D
[51] Int. Cl. ............................................. G01b 5/00
[58] Field of Search .......... 33/147 D, 148 D, 143 L; 73/88.5 R

[56] References Cited
UNITED STATES PATENTS

| | | | |
|---|---|---|---|
| 3,514,864 | 6/1970 | Davidson et al. | 73/88.5 R |
| 1,684,486 | 9/1928 | Guild et al. | 33/148 R |
| 2,588,630 | 3/1952 | Jackman | 33/148 D |
| 2,348,018 | 5/1944 | Moore | 33/148 R |
| 3,319,338 | 5/1967 | DeNicola | 33/148 D |
| 2,666,262 | 1/1954 | Ruge | 73/88.5 R |

Primary Examiner—Harry N. Haroian
Attorney, Agent, or Firm—Dugger, Johnson & Westman

[57] ABSTRACT

A strain gage extensometer used for measuring and controlling strain in tensile tests, compression tests and fatigue tests on specimens. The extensometer has a pair of arms that are connected together with a flexible element. The arms are coupled to move with the specimen when the specimen is subjected to strain and thus cause a strain in the flexible element supporting the arms. Suitable strain gages are utilized on the flexible element so that the strain in the specimen can be determined. As shown, the arms are also coupled with a cross flexure element to stabilize the arms.

11 Claims, 6 Drawing Figures

Patented Feb. 5, 1974  3,789,508

INVENTOR.
HARRY R. MELINE
BY
Dugger Peterson Johnson & Westman
ATTORNEYS

Patented Feb. 5, 1974

INVENTOR.
HARRY R. MELINE
BY
Dugger Peterson Johnson & Westman
ATTORNEYS

EXTENSOMETER

BACKGROUND OF THE INVENTION

1. Field of the Invention

The present invention relates to strain measuring extensometers.

2. Prior Art

In the prior art, there have been strain measuring extensometers utilizing arms connected with single flexure elements, and strain gage sensing means. However, these devices have low natural frequencies so that they are unsuitable for strain measurement in a fatigue test. In addition many of these devices have backlash making them unsuitable for fatigue. Most of these devices are for tension or compression but not both, so the travel limit stop is utilized to set the gage length for a test.

The present device utilizes a cross flexure member for stability. A type of a cross coupling member is shown in U.S. Pat. No. 2,697,158, but does not operate in the same manner as the present device.

Also, in the U.S. Pat. No. 2,965,866, there is a suggestion of a cross flexure member.

SUMMARY OF THE INVENTION

The present invention relates to extensometers for measuring and detecting strain in specimens including a flexible member which mounts a pair of arms. The outer ends of the arms are mounted to move with the specimen when the specimen is subjected to strain, and the flexible member is then subjected to bending. Suitable strain gages are mounted on the flexible member to determine the strain in the flexible member and thereby obtain an indication of the strain in the specimen. The strain gages are connected in known readout circuitry for determining the strain.

In addition, the present device has a stabilizing cross flexure member or link that does not adversely affect the movement of the arms, but keeps the arms from deflecting in a parallelogram made by providing a stiff hinge effect.

The extensometer is made so that it can be precisely locked at its normal gage length position, and it has overtravel stops for both compression and tension movement of the specimen. The unit is easy to make and has knife-edge blades for engaging the specimen, which can be replaced when necessary. An attachment for changing the effective gage length of the extensometer is provided.

The unit has a high natural resonant frequency to make it usable for fatigue testing at normal test frequencies 10hz to 100hz without exciting the extensometer to resonance.

DESCRIPTION OF THE PREFERRED EMBODIMENT

Figure 1:
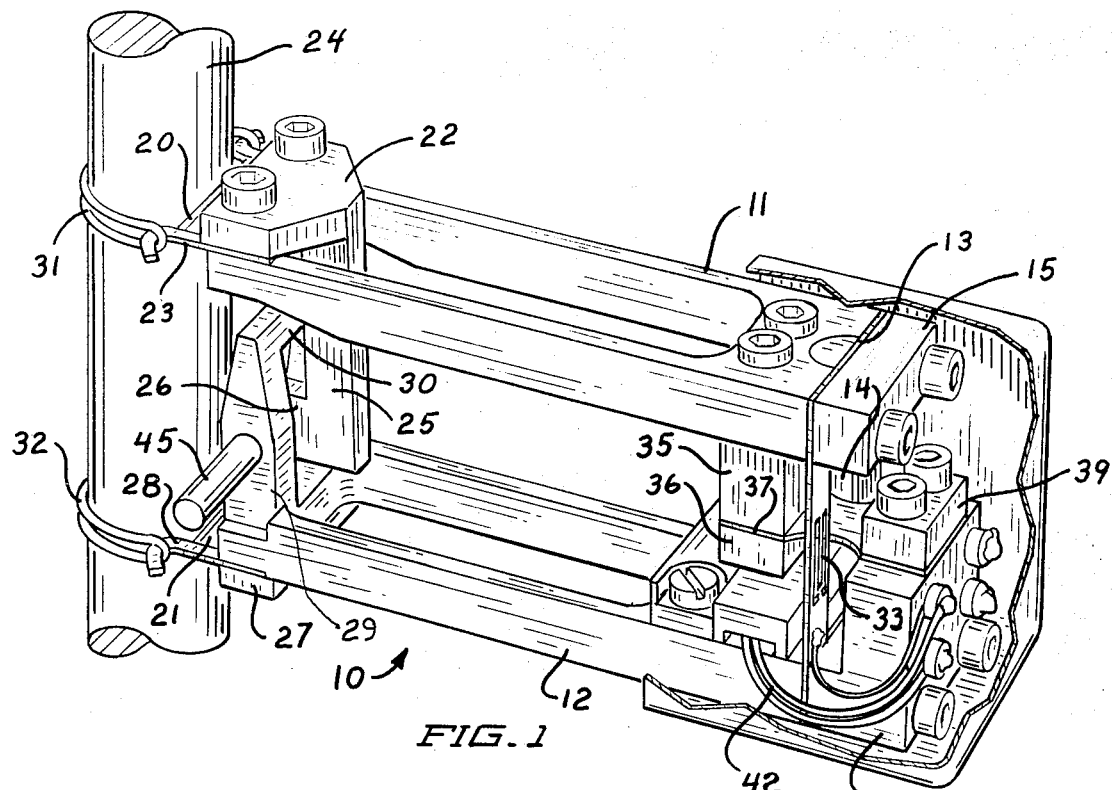
FIG. 1 is a prespective view of an extensometer made according to the present invention and shown installed on a specimen to be tested.
Figure 2:
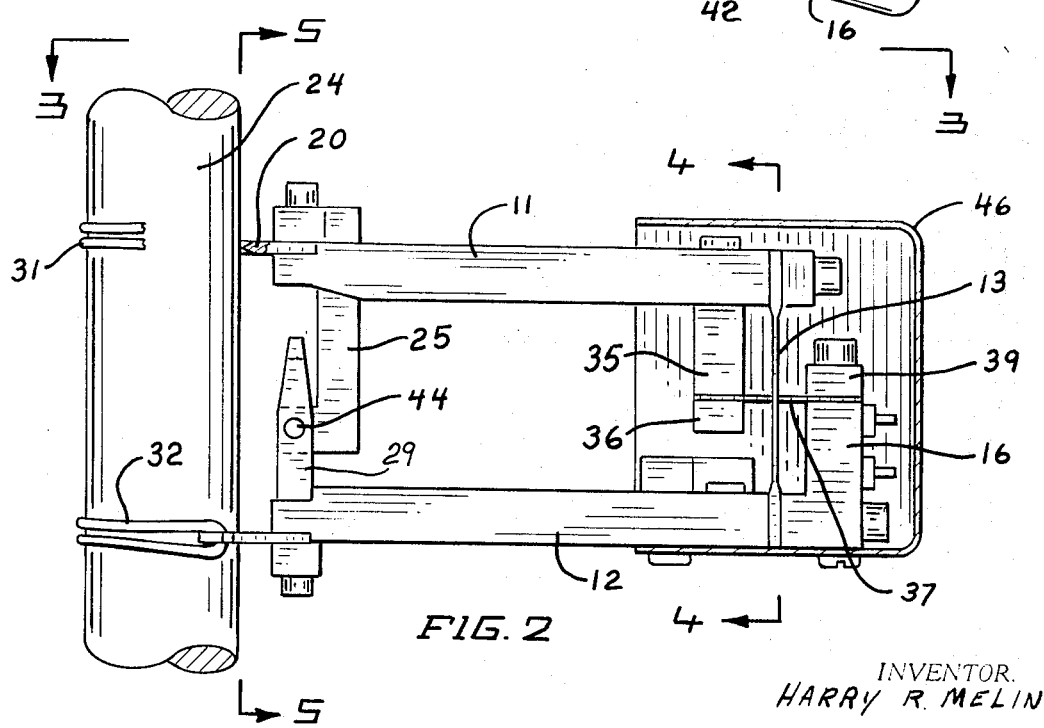
FIG. 2 is a side view of the device of FIG. 1.
Figure 3:
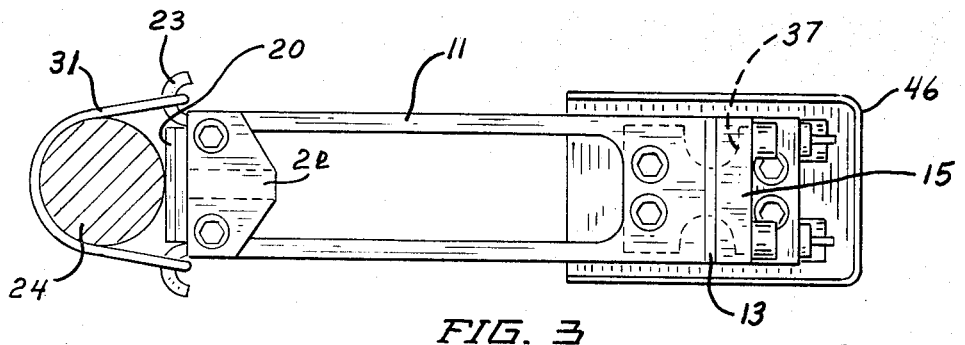
FIG. 3 is a top view taken as on line 3—3 in FIG. 2.
Figure 4:
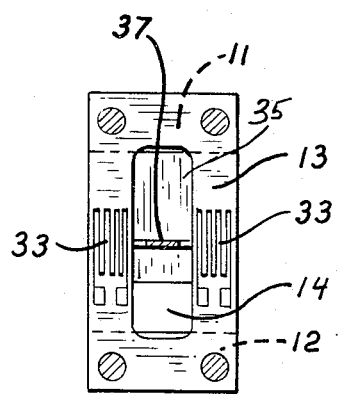
FIG. 4 is a sectional view taken as on line 4—4 in FIG. 2.

In FIG. 1, an extensometer assembly 10 as shown comprises an upper arm assembly 11, and a lower arm assembly 12 connected together adjacent one end thereof by a vertically extending first strap type link or flexure element 13. The element 13 is a thin strip of flexible material, having a center opening 14 defined therein and fastened to the upper arm 11 with a block 15 and suitable cap screws, and to the lower arm 12 with a block 16 and suitable cap screws. The element 13 is securely held in place, and forms the main mount for holding the arms 11 and 12 together.

Each of the arms 11 and 12 as shown comprises an assembly including a pair of spaced apart portions in order to reduce weight. At their outer ends, the arms each carry a knife-edge blade 20 and 21, respectively. The knife-edge blade 20 is attached to the arm 11 with a holder or cap 22, that is fastened in place onto the opposite legs of the arm 11 with cap screws, and which also clamps a small wire clip 23 that is used for attaching the extensometer to a specimen 24, as will be explained. The cap 22 also comprises one member of a stop assembly, and has a downwardly depending leg or column 25 which is positioned between the sides of the arm 11 and which has a stop lug 26 projecting therefrom. The knife-edge blade 21 is held in place on arm 12 with a holder or cap 27, fastened with cap screws, and which, as shown, clamps the knife-edge blade 21 in place. The cap 27 clamps a clip 28 in place on arm 12. The clip 28 is identical to the clip 23 and is used for holding the extensometer in place. The cap screws which hold cap 27 in place pass through arm 12 and retain a second member 29 in place on arm 12. The member 29 extends from the arm 12 toward the arm 11 and has a center opening through which the lug 26 extends when the unit is assembled. The member 29 has a cross bar 30 that serves as a stop in combination with the lug 26 to prevent the arms 11 and 12 from separating too far. The lug 26 also strikes an end cross member of arm 12 to prevent the arms 11 and 12 from compressing together too far for desired operation.

A knife-edge blades 20 and 21 are held in engagement with the specimen 24 through the use of elastic or rubber bands 31 and 32 respectively, which are hooked over the opposite ears of the clips 23 and 28, respectively. The elastic bands 31 and 32 then urge the knife-edges against the specimen 24 and the arms are thus mounted on the specimen so that when the specimen is loaded the arms will either separate or move together as the specimen is strained in tension or compression respectively.

The element 13 carries a plurality of strain gages (usually four) and these are indicated at 33. The strain gages 33 are usually located on opposite sides of the spaced legs of the flexure element 13, and these legs of course are on opposite sides of the opening 14 defined in the flexure element.

In order to stabilize the arms 11 and 12, without substantially affecting the accuracy of the extensometer a cross flexure assembly is utilized for mounting the rear portions of the arms 11 and 12. As shown, a block 35 is mounted onto the arm 11 and extends downwardly therefrom on the side of the element 13 toward knife blade member 20. A cap member 36 clamps one end of a cross flexure element or link 37 which is made of thin strip of flexible metal, and is like a leaf spring element. The other end of the element 37 is held onto the end of block 16 which has an upwardly extending portion and is mounted to the rear portions of arm 12. The flexure element 37 is clamped onto the block 16 with a cap 39. The caps are held in place with suitable cap screws.

Suitable electrical leads 42 are attached to the strain gages 33, and lead to suitable circuitry, such as a bridge circuit for measuring strains in a known manner. A resistance bridge forming a wheatstone bridge may be used together with a suitable excitation source and readout equipment.

In order to set the gage length or in other words the length between the knife-edge blades 21 and 22, the lug 26 and the legs of member 29 have an opening indicated at 44 defined therethrough. The openings of the lug 26 and the legs align when the extensometer is in neutral position. The opening is of size to receive a small dowel pin 45 to lock the lug 26 and the member 29 against relative movement when the extensometer is first installed onto the specimen 24. This pin 45 has a head that is shown in FIG. 1. The opening 44 is reamed to a close dimension tolerance in relation to the pin for accuracy in establishing the gage length of the unit.

A case 46 can be mounted over the strain gage and mounting ends of the arms 11 if desired.

When the extensometer is to be used, any movement of the knife-edge blades toward and away from each other will cause a change in the strain of the strain gages 33 mounted on the main flexure element 13. The flexure element 37, which is the cross flex element is located at the center of the flexible element 13 so that it does not substantially affect the curvature of the element 13 when the arms are displaced. However the cross flexure element 37 does give great stability to the arms and prevent the flexure element 13 from bending in an unwanted manner. The cross flexure element make the arm support act as a stiff hinge to prevent unwanted parallelogram movement of the arms thus giving the unit a high natural frequency when it is mounted to the specimen.

Figure 6:
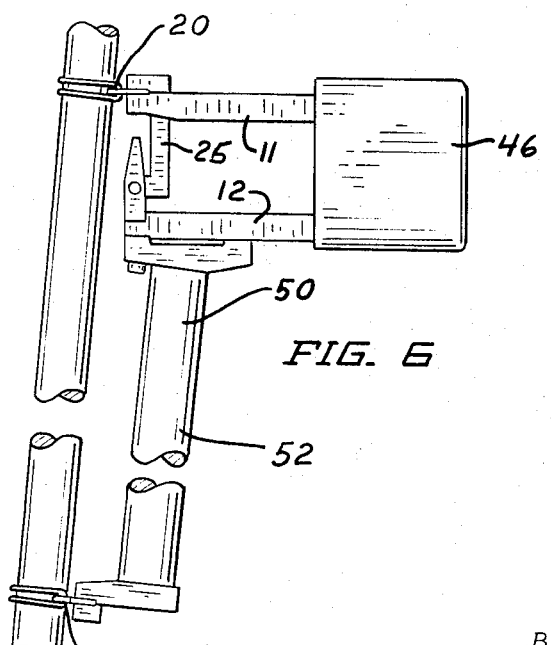
FIG. 6 is a modified form of the invention showing a gage length extender utilized with the present invention.

In FIG. 6 a modified form of the invention is shown wherein a gage length extender illustrated generally at 50 is installed on the arm 12, and carries a knife-edge blade 51 at its outer end. The length of the arm 52 can be different on different extenders to make the distance between the knife-edge blade 51 and knife-edge blade 20 any desired gage length. The rest of the construction of the unit is exactly the same, but this permits changing the gage length if desired for different applications. The extender 51 clamps on in place of the cap 27 and clip 28. The clip 28 is used at the outer end of the extender.

Figure 5:
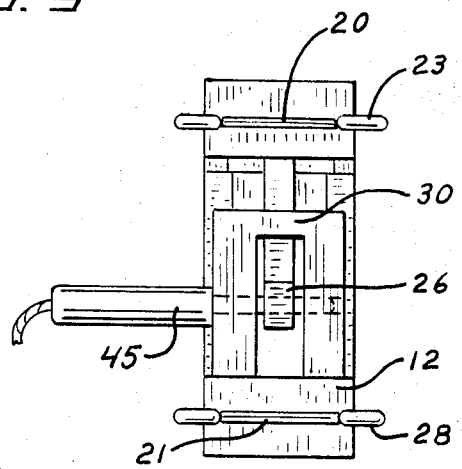
FIG. 5 is a view taken as on line 5—5 in FIG. 2.

The extensometer is suitable for fatigue testing, tensile tests and compressive tests. It is accurate, rugged, and very light weight. The device can be made out of aluminum, and because the arms are formed to have a pair of parallel extending arm portions, the weight of the unit is minimized. The overtravel stops prevent damage to the mechanism when the specimen breaks. For example, as shown in FIG. 5, the lug 26 will either strike against the cross member of the arm 12 (compression), or against the cross member 30 (tension) when the specimen breaks to present a positive stop. The legs on member 29 also prevent excessive sideways movement of the arms 11 and 12. The use of the pin 45 for establishing the gage length insures that the initial length of the gage is accurate, and this of course is a requirement for proper calibration.

The knife-edge blades are easily replaced by loosening the caps that hold them in place and inserting the new blade before retightening the caps.

What is claimed is:

1. An extensometer comprising a pair of spaced apart substantially coextensive arms, support means connected between said arms adjacent first ends of said arms, said support means including a first resilient strip element extending in a first direction between said arms and being rigidly coupled to said arms, and a second resilient strip element extending transverse to said first resilient strip element and being rigidly coupled to said arms, the planes of said first and second strip elements intersecting and forming a cross flexure connection between said arms to permit the arms to pivot relative to each other in the region where said planes intersect, means at second ends of said arms to engage a specimen to be tested whereby said second ends of said arms will move when said specimen is subjected to strain to thereby subject the resilient strip elements to bending strain, means to measure the strain in said support means, cooperating overlapping members fixed to each of said arms, respectively, and removable means engaging said overlapping member to fix the position of said overlapping members to establish a preset gage length for said extensometer.

2. The combination as specified in claim 1 wherein said overlapping members comprise a lug mounted on a first of said arms, and a bracket mounted on a second of said arms, said bracket having a pair of legs and a cross bar positioned between said legs, said lug being positioned between said pair of legs and positioned to strike said cross bar when the arms are separated a preselected amount and to strike said legs to prevent substantial transverse movement of said arms relative to each other.

3. The combination as specified in claim 2 and wherein said removable means comprises a pin, and opening means defined in said lug and in said legs whereby the pin can be inserted in said opening means when the opening means in the lug and legs are aligned.

4. The combination as specified in claim 1 wherein said means on said arms to engage said specimen comprise removably mounted knife-edge blade means on each of said arms.

5. The combination as specified in claim 4 and hook means extending on opposite sides of said knife-edge blade means, an elastic band, said hook means being of size to receive and retain said elastic band when said band is positioned around said specimen to elastically urge said knife-edge blade means toward said specimen.

6. The combination as specified in claim 4 and adapter means to change the distance between said knife-edge blade means, said adapter means comprising a column, means to mount said column on one of said arms in the place of one of the knife-edge blade means, and knife-edge blade means at the outer end of said column positioned to engage said specimen.

7. The combination as specified in claim 1 wherein said first element comprises a strip of material having an opening in the center portions thereof, and said second element comprises a strip of material which extends through said opening in said first element and at substantially right angles thereto.

8. The combination as specified in claim 1 wherein first and second elements comprise strips of material and the planes of said first and second elements are at substantially 90° to each other.

9. An extensometer comprising a pair of separated arms, a first resilient strip rigidly attached at its ends to said arms and extending between said arms, a second resilient strip positioned transversely to the first resilient strip, the ends of said second resilient strip being on opposite sides of the plane of said first resilient strip, means to rigidly attach the ends of said second strip to said arms at locations spaced from the attachment of the first strip to said arms respectively, said resilient strips being positioned adjacent first ends of said arms, means to engage a specimen to be tested and to move with said specimen at second ends of said arms, said resilient strips permitting said arms to pivot as the second ends of said arms move, said resilient strips flexing to permit said movement, means to measure the strain in at least one of said resilient strips, and stop means adjacent the second ends of said arms comprising a lug mounted on a first of said arms, and a bracket mounted on a second of said arms, said bracket having a pair of legs and a cross bar positioned between said legs and spaced from the second arm, said lug being positioned between said pair of legs and positioned between the second arm and the cross bar to thereby engage said cross bar when the arms are separated a preselected amount and to engage said legs to prevent substantial transverse movement of the second ends of said arms relative to each other.

10. The combination as specified in claim 9 wherein said first resilient strip has an opening in the center portions thereof, and said second resilient strip extending through said opening in said first element and at substantially right angles thereto.

11. The combination of claim 9 wherein said arms have coplanar end surfaces at the first ends thereof, said first strip being positioned to extend between said arms, said means to rigidly connect the ends of said first strip to said arms comprising means to clamp said strip against end surfaces of said arms, spacer blocks fixed to each of said arms and extending toward the opposite arm, said spacer blocks having coplanar end surfaces defining a plane at substantially right angles to said arm end surfaces, and wherein said means to rigidly connect the ends of said second strip to said arm comprises means to clamp the ends of said second strip against the end surfaces of said spacer blocks.

* * * * *